July 4, 1961
P. SPENCE
2,990,721
TEMPERATURE REGULATOR
Filed March 25, 1957
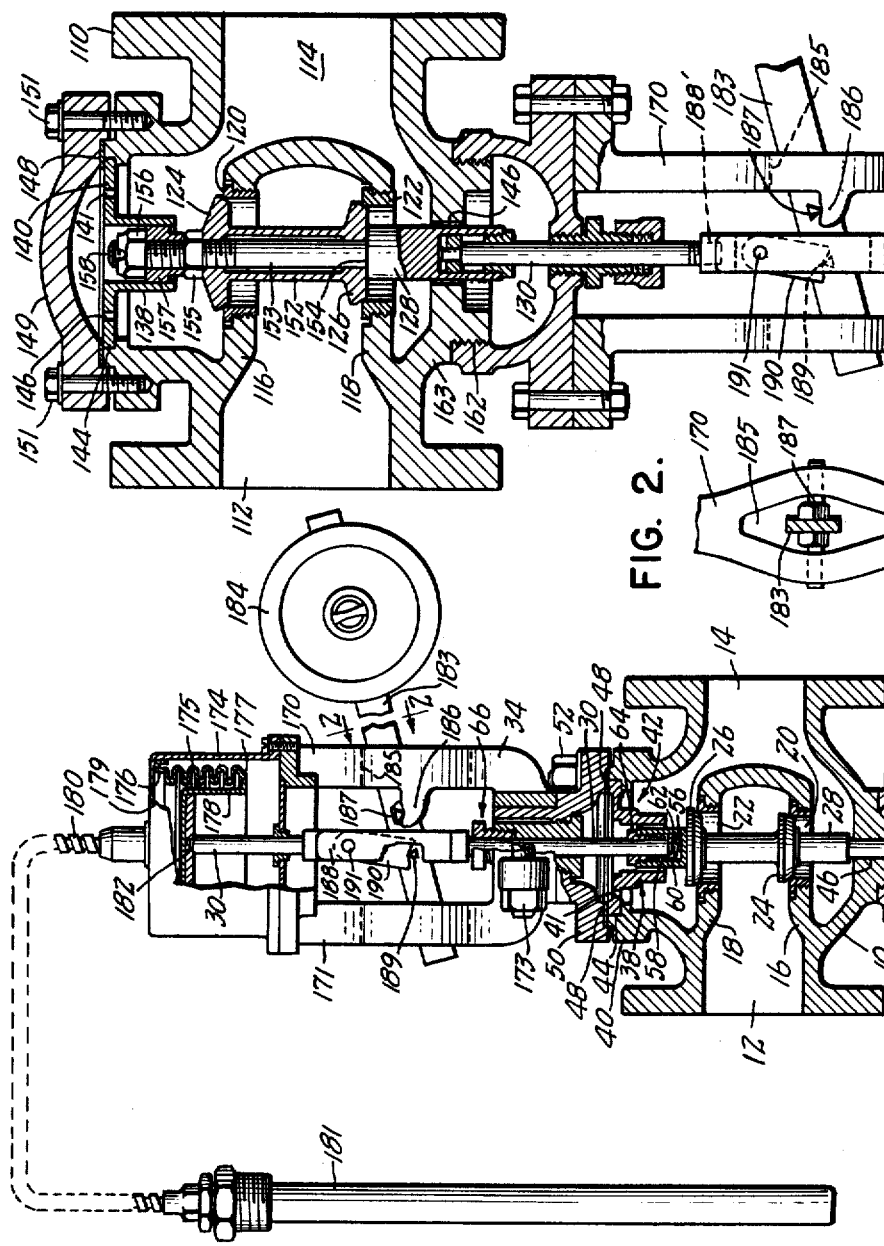
INVENTOR.
PAULSEN SPENCE
BY
ATTORNEYS

United States Patent Office 2,990,721
Patented July 4, 1961

2,990,721
TEMPERATURE REGULATOR
Paulsen Spence, P.O. Box 77, Baton Rouge, La.
Filed Mar. 25, 1957, Ser. No. 648,078
1 Claim. (Cl. 74—102)

My invention relates to valves and, in particular, to double-ported valves in which there is a requirement for great accuracy in the concentric seating of the valve discs.

The present application is a continuation-in-part of my earlier application, Serial No. 255,451, filed November 8, 1951, which has matured into Patent No. 1,786,487.

To make for ready assembly and disassembly of double-ported valves, it has been customary to make one of the discs smaller than the valve-seat opening for the other disc, whereby an assembly of discs on the valve stem may be inserted as a unit into the valve seats. This procedure requires that a rather large opening be left in the valve body to permit introduction of the assembled valve-operating elements. There follows then a problem of providing suitable guide means for the exposed part of the valve stem at the side of the body on which the large opening exists. Previously, this guide means has been so awkward that the point of guiding support is substantially spaced from the operating position of the valve, so that it has been usual to fabricate the valve stem from two pieces, threading one into the other. Such structure is susceptible to misalignment difficulties and, clearly, the distant point of support is not desirable in some applications.

It is, accordingly, an object of my invention to provide an improved double-ported valve structure.

It is another object to provide an improved guide means for a valve stem.

It is also an object to provide improved means for supporting the operating elements of a double-ported valve.

Another object is to provide improved actuating means for a valve.

It is a further object to provide improved means for sealing valves in which a valve-stem guide is inserted after insertion of the valve stem.

It is a specific object to provide an improved valve construction wherein not only may there be aligned guided support of the valve stem on both sides of the valve members, but all valve-member parts may be immediately accessible for removal or replacement, merely upon removal of a single bonnet member, and without disturbing the assembly or the setting of the valve-actuating means.

Another specific object is to provide non-sticking valve-guide means in constructions of the character indicated, whereby smooth operation may be assured even when the valve is subjected to very high pressures.

Other objects and various further features of the invention will hereinafter be pointed out or will appear from a reading of the following specification, in conjunction with the accompanying drawings, in which:

FIG. 1 is a vertical sectional view of a valve, and operating means incorporating features of my invention;

FIG. 2 is a fragmentary view taken substantially in the plane of the line 2—2 of FIG. 1.

FIG. 3 is a fragmentary section of a modified form of valve according to the invention.

Broadly speaking, my invention seeks to assure concentricity and accuracy of the seating and other operation of a double-ported valve by providing accurately machined valve-stem supports or guides in close proximity to the operating positions of the valve. In the form to be specifically described, valve-actuator means are operatively connected to a single-piece valve stem virtually at the point of support of said stem, and this connection is a flexible or loose one, whereby axial misalignment of the actuating means with respect to the valve stem cannot impair accurate seating and other operation of the valve. The guide adjacent the larger valve disc is nested in a locating ring or seat on the valve body; this ring is preferably machined at the same time as the other valve-stem guide and the valve-seat openings are machined, whereby complete concentricity of all operating members is assured. Improved sealing means are also provided for sealing the interfit of the sleeve member with the valve body at the locating ring or seat.

The valve member may be removably mounted on the valve stem in such a way as to provide quick replacement of the valve member or members with minimum dismantling, as by the mere removal of a bonnet. This feature may be realized while maintaining proper concentric, guided alignment of the valve member on both sides thereof; and, while the members are being removed, there need be no disturbance of the assembly or setting of the valve-actuating means. Improved valve actuating means have been provided. In application to high-pressure steam or other valves where there may be tendencies for a closely guided fit to become gummed and therefore sticky, I have provided means for virtually eliminating the accumulation of gum, so that smooth operation may be assured at all times.

Referring to FIG. 1, my invention is shown applied to a double-ported valve having a valve body 10, an inlet 12, and an outlet 14. The valve body 10 is formed with lower and upper partitions 16 and 18, having seats 20 and 22, respectively, for coaction with the valve discs or members 24 and 26 carried by a stem 28. The seats 20—22 may be threaded inserts in the partitions 16—18, and the lower disc 20 is of a size to pass through the opening in the upper seat 22. In the form shown, the valve stem 28 is displaced by actuating means to be later described including a connecting or actuator rod 30. The elements thus far described, including a standard 34 for support of the actuating means, broadly are conventional and well known in the art.

According to one feature to the invention, I provide improved means for supporting the end of the valve-stem 28 adjacent the upper, and larger, valve seat 22. This improved support, in the form shown, comprises a sleeve member 38 having a flange 40 concentric therewith. Flange 40 extends radially to span the relatively large opening 42 in the valve body. Flange 40 may be provided with apertures 41 to provide essentially no pressure differential across flange 40. To assure concentricity of the sleeve 38 with respect to seats 20 and 22, the flange 40 is nested in a locating ring or seat 44. Preferably, the locating-seat 44 is machined into the valve body 10, at the same time as are the valve-seat openings and the lower guide 46 for the small end of the valve stem 28.

In the form shown, the outer and otherwise exposed surfaces of flange 40 and valve body 10 are coplanar in the region of locating ring 44. This arrangement makes possible the employment of a single sealing member, such as a gasket 48, to overstand the line of interfit between these members. Gasket 48 may be rendered effective as a seal by clamping the base 50 of standard 34 to the valve body 10, as by means of bolts 52. It will be clear that with the seal arrangement described, it is possible in one operation effectively to seal against leakage of high pressures from either side of the flange 40 and that the sealing means in no way interferes with the accurate concentric placement of sleeve 38 with respect to the members.

As indicated above, I employ a loose-jointed mechanism for attachment of the actuating rod 30 to the valve stem 28, and this joint is effected substantially at the point of support of the valve stem. In the form shown, the outer surface at the upper end of the valve stem 28 is slidable within the sleeve 38, and this end is also bored to receive the free-joint connecting means. In the event of possible misalignment of the actuator rod 30 with the valve stem 28, actuator rod 30 is provided at its thrust end with a generally spherical surface 56 for more effective transfer of purely axial thrust to the valve stem 28. The actuator rod 30 is resiliently held in this position by means of a spring 58 compressed for abutment on the one hand with a collar 60 secured (as by a pin 62) to the actuator rod 30 and, on the other hand, with a guide bushing 64 threadedly engaging the bore of stem 28. Conventional means, such as a stuffing box 66, may be employed to position and to seal off the actuating means 30.

In FIG. 3, the features of my invention are shown applied to a modified form of double-ported valve. The valve includes a valve body 110, having an inlet 112, an outlet 114, and two partitions 116 and 118. The larger valve-seat 120 is above the smaller seat 122. The valve discs 124 and 126 cooperating with these seats are of such size that the assembly of discs on the stem 128 may be removed upward through the seat 120 and disassembled. Support for the lower stem 128 is provided in a guide 146, and my novel guide-locating and sealing means is applied to the upper end of stem 128. Again, this novel guide is shown to comprise a sleeve 138, having a flange 140 concentric therewith. The flange 140 is preferably nested in a locating ring-seat 144 in the valve body 110, and the outer surfaces of the valve body and of the flange are flush or essentially coplanar to permit employment of a single gasket or sealing member 148. A body casing member or bonnet 149 may be secured as by bolts 151 to the valve body 110 to render the sealing means effective, as will be clear. Flange 140 is preferably provided with apertures 141 to permit the free admission of pressure fluid to both sides of the flange, whereby resistance to the sliding operation of valve stem 128, within the sleeve 138, is rendered negligible.

The actuating means for the valve of FIG. 3 may be generally similar to that of FIG. 1, the actuating forces being applied to the lower end of valve stem 128. The flexible or loose-joint mechanism and the arrangement for transferring thrusts from the actuator rod 130 to the valve stem 128 will be recognized as generally similar to those shown for the valve of FIG. 1.

It is a feature of the construction of FIG. 3 that the valve member means 124—126 may be readily removed without disturbing other parts of the assembly, merely upon removal of the bonnet 149. In the form shown, the valve-member means 124—126 comprises a spool 152, with the respective members 124—126 integrally formed therewith. The valve-member assembly is removably supported on a reduced part 153 of the valve stem, and seated against a shoulder 154 on the valve stem. A nut 155 on the threaded end of the valve stem holds the valve member in place, and a second or lock nut 156 retains a guide boss 157 for guided coaction with the guide sleeve 138. The end of the stem 153 may be slotted as at 158 to receive a screw-driver or other tool when setting the nut 156. It will be clear that, upon removal of the bonnet 149, the flange guide 138 may be merely lifted out so as to expose the securing means 155—156. Upon removal of such securing means, the valve-member spool 152 may be lifted out and, if necessary, replaced, all without disturbing connections to the actuating means.

It will be noted that the lower end of the guide sleeve 138 cooperates with the upper surface of the valve member 124 to form a stop. This stop determines the upper limit of travel of the valve, and assures the guided support of the stem on both sides of the valve members and for the full travel of the valve members.

It will be clear that I have described double-ported valve structures which lend themselves to ready assembly and fabrication of parts. Of particular importance is the feature of providing accurately positioned guides supporting a single-piece valve stem at points close to operating positions of the valve members and on both sides of these members. Inaccurate seating of either valve disc is virtually impossible, for there can be no misalignment of the operating parts. In the case of FIG. 1, misalignment of actuator 30, with respect to the valve stem 28, due to a gasket 48 of non-uniform thickness, or due to unevenness in the take-up of the bolts 52, cannot adversely affect operation of the valve. Similarly, in FIG. 3, misalignment of actuator 130 with respect to valve stem 128, non-uniform thickness of gasket 48, or unevenness in the take-up of the bolts 151, cannot impair valve efficiency.

As a further feature, my improved valve constructions provide a means for ready access to the valve member or members so as to remove or replace the same with a minimum of dismantling and without disturbing the assembly or setting of the actuating means. A small bonnet is all that needs to be removed, and yet fully aligned, guided support is achieved on both sides of the valve member. Additionally, my construction substantially eliminates any tendency of the valve stem to stick in its guide, by providing a guide which is always lubricated.

The valves shown in FIGS. 1 and 3 are preferably operated by the same means to be described. Secured to the valve body, and particularly the bonnet, such as the bonnet 50, is the yoke 34, which has the two arms 170—171 having a ring seat at the bottom secured to the bonnet as by means of a screw or bolt 173. This yoke, including the arms 170—171, at the top supports an inverted cup 174, and within that cup is a Sylphon 175 secured to the bottom of the cup as by means of soldering at the point 176. The bottom of the Sylphon is secured as by crimping and soldering at the point 177 to the edge of a second inverted cup 178, which is smaller than the cup 174, so as to leave an annular space between its wall and the Sylphon 175 and between its bottom and the bottom of the cup 174, as will be clear. A fluid-pressure connection is made to the space 179 between the cup 174, the Sylphon 175 and the inner cup 178. This fluid pressure connection may be in the form of a flexible tubing 180 connected to the thermostat bulb 181, as will be understood. Thus, when the thermostat bulb 181 is heated up, the fluid therein will exert a pressure in the space 179 and depress the inner cup 178. The valve actuating rod 30 is connected at the top, as indicated at 182, to the bottom of the small cup 178, as by screwing the end of the rod 30 into the reinforcing plate on the bottom of the cup 178. Thus, variations in fluid pressure in the space 179 will move the valve actuating rod 30 up and down to open and close the valves 24—26, as will be clear.

The valves 24—26 are constantly urged toward open position by suitable means, preferably a weighted lever, as shown in the drawing. The lever 183, carrying an adjustable weight 184, passes through a slot 185 in the yoke arm 170. The lever further passes through a slot in the yoke arm 171 so that it is more or less held in the yoke against tipping about its longitudinal axis. In the preferred form, the arm 170 has a pair of spaced ears, such as the ear 186 carried on the two separated arm portions forming the slot 185. These ears 186 may embrace the lever 183 so as to tend to guide the same, and a knife-edge pin or pintle 187 carried by the lever rests on the top of the ears 186 so as to form a very fine balancing point for the lever. The top of the ears 186 may be slightly hollowed out or raised at the ends so as to tend to confine the lever to the longitudinal position more or less as shown in the drawing.

The lever 183 is connected to the valve actuating rod 30 in such a way as not to put any substantial side strains on the rod. In the form shown, the rod 30 is provided with a lever yoke 188, which may be screwed to the ends of the rod 30 at its points of connection, as suggested at 188' in FIG. 3. The lever 183 preferably passes through the yoke 188, and the lever has a knife-edge pin 189 projecting therefrom and engaging the bottom ends of swinging levers 190 pivotally mounted on the yoke at the pivot point 191. These links have a notch therein for the knife-edge pin 189 to fit in, and as the lever 183 swings about its fulcrum 187 the links may oscillate about the pivot point 191 and thus move the actuating rod 30 upwardly but without putting any substantial side strains on that rod. Thus, the actuating rod is at all times accurately guided and movable by means of a lever, all without any substantial side strains thereon to cramp the actuating rod 30 in its up and down movements.

By setting the weight 184 on the lever at the proper point, the proper upward force tending to open the valves 24—26 will be obtained. When the fluid pressure in the space 179 creates a force on the rod 30 higher than the opposing force created by the weighted lever, the valves 24—26 will be closed. Due to the knife-edge fulcrum points, minute variations in settings of the weight 184 on the lever 183 will be reflected in the valve action.

The valve actuating rod 30 passes through a stuffing-box on the valve body or hood, but the rod 30 is merely guided in the closure of the big cup 174 because there is no pressure to leak past such a guide. Pressure, acting on the valves to close the same, is confined in the space 179 and in the thermostatic bulb 181 and its connection to the space 179.

It will be seen, then, that I have provided an improved double ported valve, wherein all of the seats and guides may be maintained in strict concentricity so that the actuating rod attached to the valves may move the same without any jamming action. The actuating rod itself passes through one stuffing-box when entering the valve body and is otherwise merely guided in its travel, and friction is thus reduced to a minimum and any sticking of the parts is prevented. Due to the arrangement of the lever and its fulcrum points and the links, substantially no side strains will be placed on the actuating rod 30 during its movement in actuating the valves 24—26.

It will be understood that exactly the same mechanism may be employed for operating the valve shown in FIG. 3, except a reversal of the fluid pressure actuated means and so no separate showing nor specific description of that added construction has been shown.

While I have described my invention in considerable detail, in connection with the preferred forms shown, it should be understood that various modifications may be made without departure from the invention as defined in the claim which follows.

I claim:

In a valve of the character indicated, a valve body, a valve actuating rod projecting from said body, a yoke carried by said body, fluid pressure actuating means carried by said yoke and connected to said valve actuator rod for moving the latter in one direction, said yoke comprising a pair of upright spaced apart legs at opposite sides of said valve actuating rod so as to define two access openings for direct access to said rod between said legs, each of said yoke legs having vertically elongated openings so that a lever can move vertically in each opening when pivoted at a point between the yoke legs, a lever passing through both said openings, a weight on said lever, one of said legs of said yoke having abutments projecting generally toward the other leg, a knife-edge fulcrum member carried by said lever and resting on said abutments at a point intermediate said yoke legs, said actuator rod having an opening therethrough, said lever passing through said opening, link means pivotally pinned to said valve actuator rod within said opening, a knife-edge fulcrum on said lever and cooperating with abutment surfaces on said link means to oppose fluid-pressure actuated movement of said rod, said link means being between said legs and accessible via both said access openings, whereby said link means may swing and minimize the effect of angularity of said swinging lever in moving said valve actuator rod.

References Cited in the file of this patent

UNITED STATES PATENTS

| | | |
|---|---|---|
| 660,872 | Taylor | Oct. 30, 1900 |
| 846,947 | Purtle | Mar. 12, 1907 |
| 2,021,053 | Englebright | Nov. 12, 1935 |
| 2,772,574 | Thomas | Dec. 4, 1956 |
| 2,908,478 | Starrett | Oct. 13, 1959 |